United States Patent [19]
Manning et al.

[11] 3,985,035
[45] Oct. 12, 1976

[54] POWER TRANSFER UNIT

[75] Inventors: Donald L. Manning, Orchard Lake; Milton H. Scheiter, Northville, both of Mich.

[73] Assignee: General Motors Corporation, Detroit, Mich.

[22] Filed: Aug. 12, 1974

[21] Appl. No.: 496,767

Related U.S. Application Data

[63] Continuation of Ser. No. 260,396, June 7, 1972, abandoned.

[52] U.S. Cl. .................. 74/15.63; 74/665 F; 74/665 GE
[51] Int. Cl.² ............................................ F16H 37/06
[58] Field of Search ............ 74/15.6, 15.63, 15.2, 74/15.88, 665 F, 665 GA, 665 GB, 665 GC, 665 GE, 722, 216.5, 219, 339, 417, 695; 123/195 A

[56] References Cited
UNITED STATES PATENTS

| | | | |
|---|---|---|---|
| 2,213,682 | 9/1940 | Antonsen | 123/195 A |
| 2,258,478 | 10/1941 | Baker et al. | 74/665 GE |
| 2,288,254 | 6/1942 | Rich et al. | 74/665 GE |
| 2,303,093 | 11/1942 | Schreck | 123/195 A |
| 2,766,628 | 10/1956 | Wilson | 74/15.88 |
| 2,784,557 | 3/1957 | Wilson | 74/722 |
| 2,821,868 | 2/1958 | Gregory | 74/665 F |
| 3,011,353 | 12/1961 | Friedrich et al. | 74/665 GA |
| 3,151,503 | 10/1964 | Keller | 74/665 GE |
| 3,412,724 | 11/1968 | Scheiterlein et al. | 123/195 |
| 3,470,765 | 10/1969 | Campbell | 74/417 |
| 3,566,714 | 3/1971 | Barello | 74/661 |
| 3,703,107 | 11/1972 | Piret | 74/695 |

*Primary Examiner*—Samuel Scott
*Assistant Examiner*—Allan R. Burke
*Attorney, Agent, or Firm*—John P. Moran

[57] ABSTRACT

The drawings illustrate a power transfer arrangement wherein the power from any of a gas turbine, diesel, or piston engine is transferred via a chain drive to either a toric or a conventional automatic or manual transmission, in either desired rotational direction, with additional provisions for driving a plurality of accessory drive sprockets via a chain drive from the transmission input, such that, whatever combination of engine and transmission is selected, the accessories will always operate in the same originally established direction and speed range within 5 rpm.

3 Claims, 12 Drawing Figures

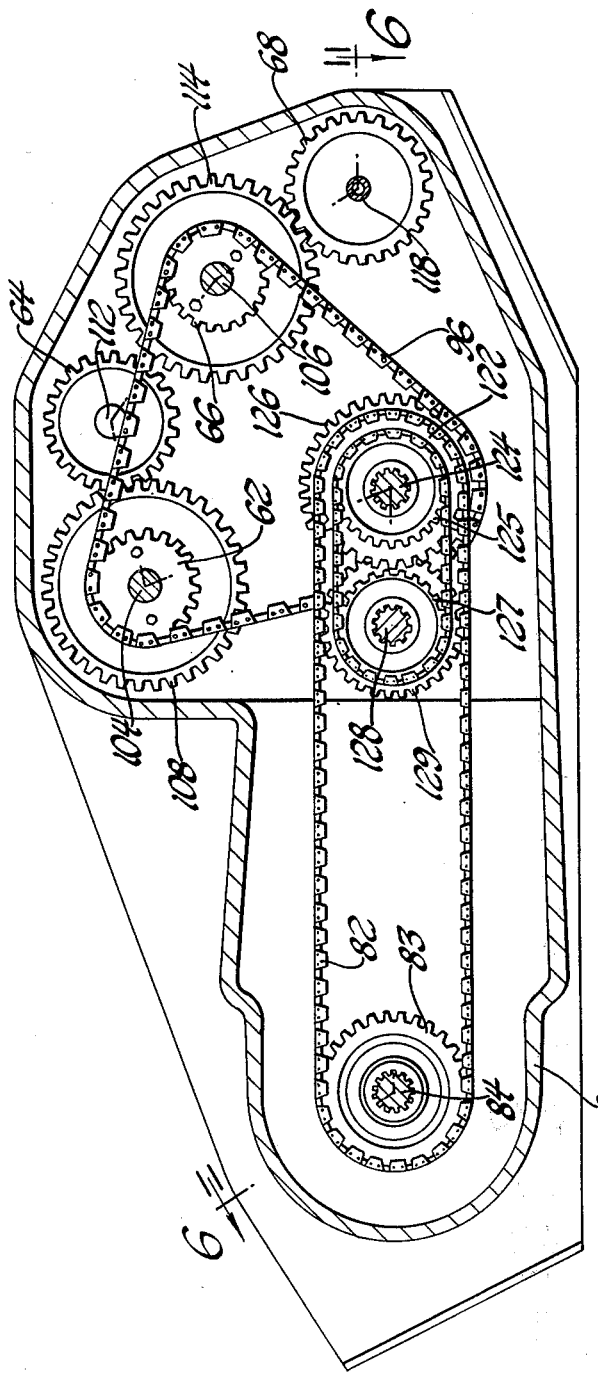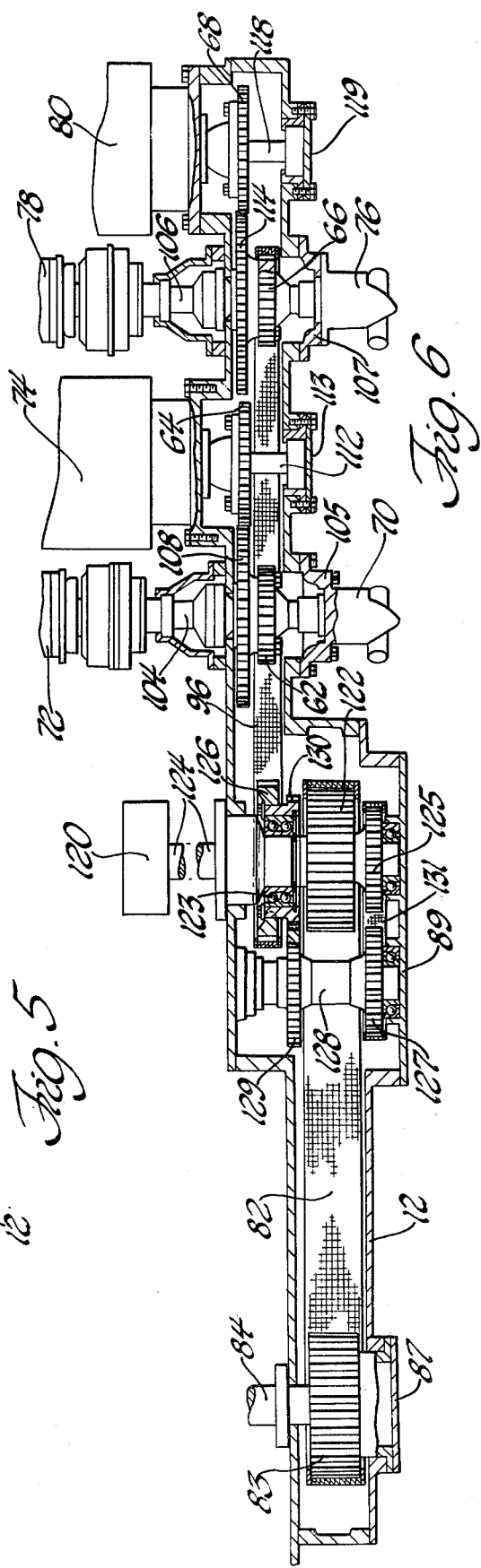

POWER TRANSFER UNIT

This is a continuation of application Ser. No. 260,396, filed June 7, 1972, now abandoned.

This invention relates generally to power transfer units and, more particularly, to a power transfer arrangement wherein any engine-transmission combination may be utilized while driving all of the vehicular accessories within substantially constant speed ranges and in the same direction of rotation.

Power transfer units have heretofore been known to include a chain drive for transferring power from an engine to a transmission; prior power transfer units have also been known to include a plurality of accessories which are mounted in a compartment formed on a front portion of an engine and driven by a chain drive directly from the engine, for example, the arrangement illustrated in U.S. Pat. No. 2,303,093 Schreck, dated Nov. 24, 1942. None of these arrangements provides for interconnecting engines and transmissions in a compact manner while operating all of the vehicular accessories within substantially constant speed ranges regardless of the engine-transmission combination.

Accordingly, an object of the invention is to provide an improved, compact power transfer unit which efficiently transfers power from any selected known engine to any selected known transmission while actuating all the vehicular accessories from the input to the transmission at substantially constant speed ranges and in the same originally established direction of rotation.

Another object of the invention is to provide an improved power transfer unit including an accessory drive box which accommodates the mounting therein of a plurality of accessories, with all the accessories functioning within respective 5 rpm maximum speed ranges when the accessory drive box is adapted to any combination of a diesel, gas turbine, electric, steam or piston engine with any one of a toric or conventional automatic or manual transmission.

A further object of the invention is to provide an improved accessory drive box wherein a plurality of selected accessories are mounted on pads or bosses formed on the inner wall thereof, the latter remaining the same for any engine-transmission combination, and including provisions for a first drive chain between the engine and transmission shafts, with a second drive chain driven off the engine drive shaft and adapted to drive a portion of the various accessories, the latter arranged to drive other selected accessories via a gear and/or further chain drive arrangement.

Still another object of the invention is to provide a power transfer arrangement from an engine to a transmission and to all the vehicular accessories wherein the engine and transmission, regardless of the type of either, are mounted side-by-side so as to take up minimal longitudinal space in a vehicle, such as a coach or truck, with all of the vehicular accessories adjacent the forward end faces of the engine and transmission.

These and other objects and advantages of the invention will be apparent when reference is made to the following description and accompanying drawings, wherein:

FIG. 5 is a cross-sectional view of a particular power transfer arrangement embodied in the invention;

FIG. 6 is a cross-sectional view taken along the plane of line 6—6 of FIG. 5, and looking in the direction of the arrows;

Figure 1:
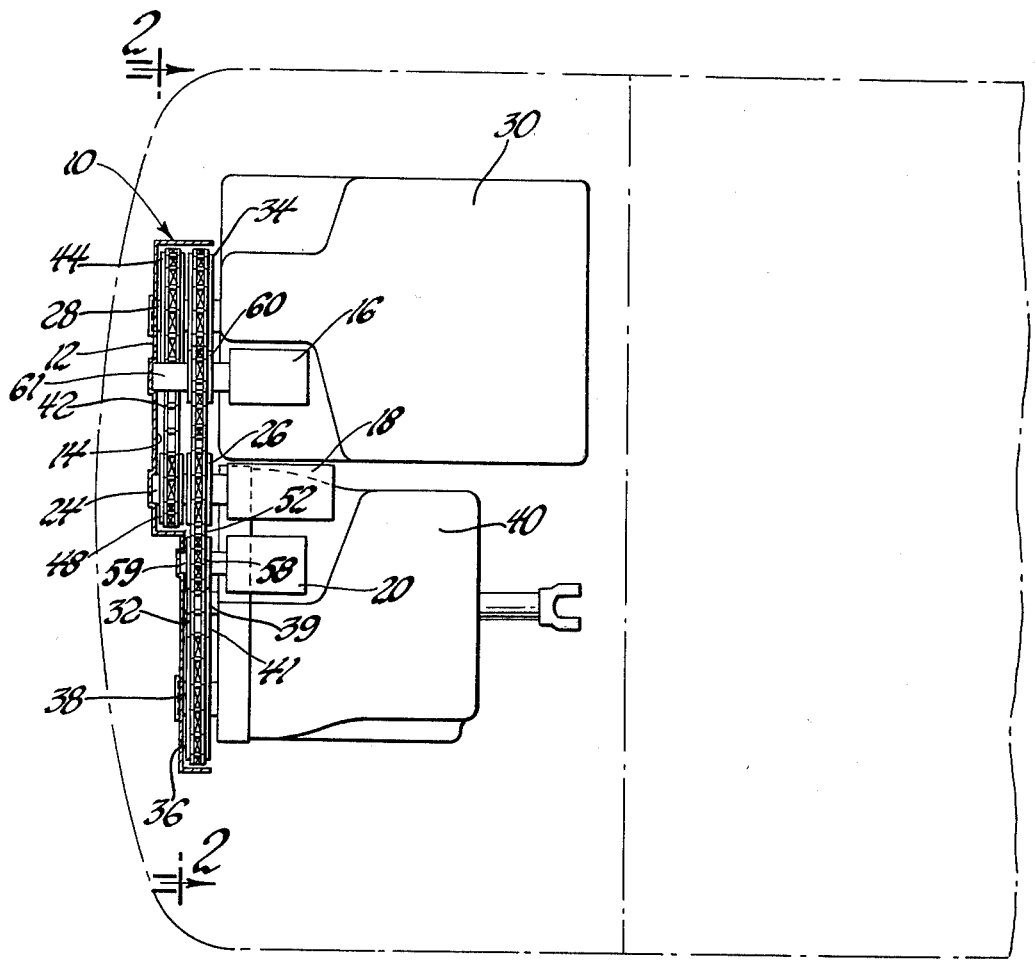
FIG. 1 represents a plan view of an engine-transmission combination embodying the invention.
Figure 2:
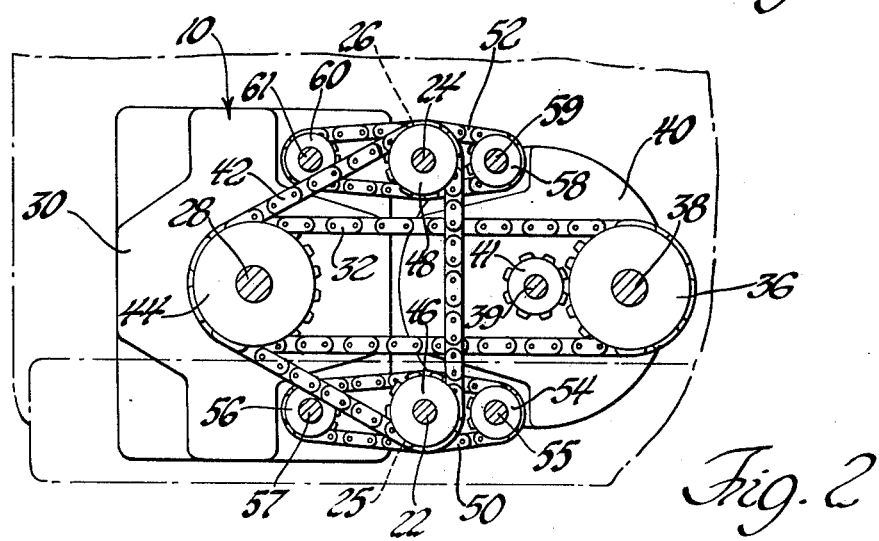
FIG. 2 is a cross-sectional view taken along the plane of line 2—2 of FIG. 1, and looking in the direction of the arrows.

Referring now to the drawings in greater detail, FIGS. 1 and 2 illustrate a chain drive mechanism 10 including an outer box or case 12, on the inner surface 14 of which are formed a plurality of accessory drive pads or bosses, as will be explained relative to other Figures hereinafter, for mounting typical accessories, such as an airconditioning compressor, generator, and transmission pump, represented generally at 16, 18, and 20 in FIG. 1. Other accessories would, of course, be mounted on the opposite side with respect to the engine 30 and transmission 40. A drive shaft 28 from the engine 30 extends into the case 12. A first endless drive chain 32 is mounted around a sprocket 34 formed on the drive shaft 28 and a sprocket 36 formed on a transmission countershaft 38, the latter extending into another portion of the case 12 from the conventional automatic or manual transmission 40. Depending upon the direction of rotation of the engine 30, a reversing gear 41 may be used to mesh with the sprocket 36 to reverse the effective rotation of the engine 30 and drive the main output shaft 39 of the transmission 40. A second endless drive chain 42 is also mounted around a sprocket 44 (FIG. 1) formed on the engine drive shaft 28 adjacent the sprocket 34, and thence around sprockets 46 and 48, which are respective shafts 22 and 24 rotatably supported on mounted on two of the above mentioned accessory pads. Companion sprockets 25 and 26 are mounted on the shafts 22 and 24, respectively, for rotation with the respective sprockets 46 and 48. Other chains 50 and 52 are mounted around the sprocket 25 and other sprockets 54 and 56, and the sprocket 26 and other sprockets 58 and 60, respectively. The sprockets 54, 56, 58, and 60 are mounted on four shafts 55, 57, 59, and 61 (FIG. 2) which are rotatably supported on four of the above-mentioned accessory pads.

Referring now to the right-hand portion of FIGS. 5 and 6, it may be noted that the case 12 includes mounting pads and gears which are positioned somewhat differently from the arrangement discussed relative to FIGS. 1 and 2. Specifically, four rotatably mounted gears 62, 64, 66, and 68 serve to accommodate a first power steering pump 70 and air conditioner compressor 72, a first generator 74, a second power steering pump 76 and air conditioner compressor 78, and a second generator 80, respectively.

Figure 3:
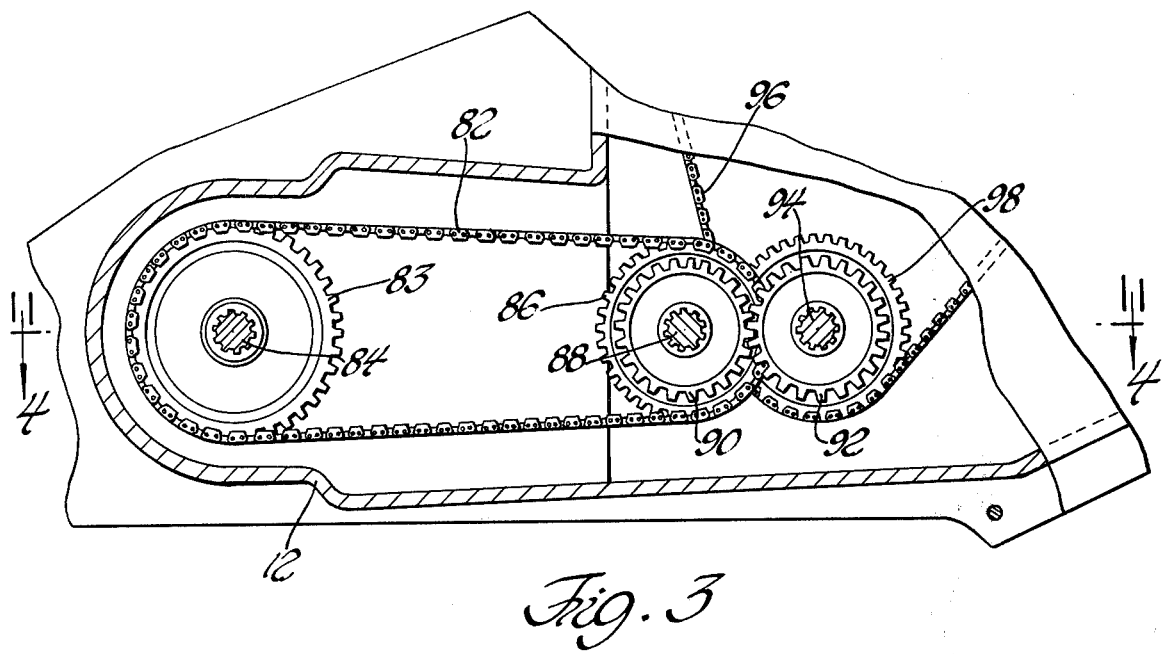
FIG. 3 is a fragmentary cross-sectional view of a portion of the power transfer means embodied in the invention.
Figure 4:
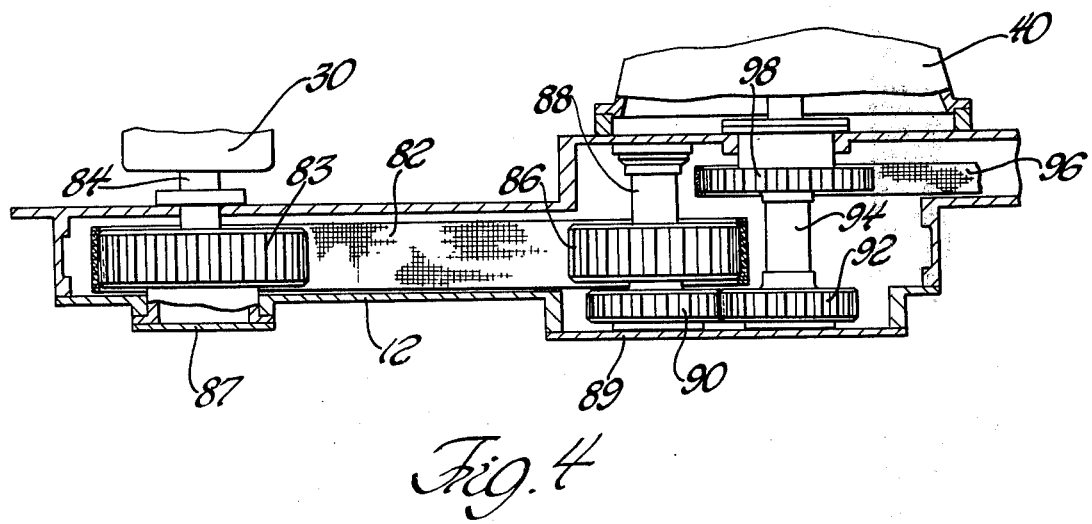
FIG. 4 is a fragmentary cross-sectional view taken along the plane of line 4—4 of FIG. 3, and looking in the direction of the arrows.

Referring now to FIGS. 3 and 4, it may be noted that a chain 82 is interconnected between a sprocket or gear 83 mounted on a shaft 84 extending into the case 12 from the engine 30 to a sprocket 86 mounted on a countershaft 88 of the transmission 40. The shafts 84 and 88 are rotatably mounted on suitable pads or bosses 87 and 89, respectively, formed on the case 12. A gear 90, also mounted on the countershaft 88, drives gear 92 formed on the transmission mainshaft 94, the latter also rotatably mounted on the pad or boss 89. A narrower chain 96 is mounted around a sprocket 98 formed on the mainshaft 94 for driving the accessories, as will be explained.

In the event a toric transmission, represented at 120 (FIG. 6) and illustrated and described in U.S. patent No. 3,574,289, issued in the names of Scheiter and Dickenbrock on April 13, 1971, is used instead of the conventional transmission 40, the chain 82 exends from the sprocket 83 to a sprocket 122 formed on a mainshaft 124 of the toric transmission 120, the mainshaft 124 being rotatably mounted on the boss 89 in place of the above-mentioned mainshaft 94. A sprocket 125 is secured to the mainshaft 124. The sprocket 125 drives a sprocket 127 mounted on a separate shaft 128 by means of an interconnecting chain 131. A gear 129 is also secured on the shaft 128, and meshes with a gear 130 rotatably mounted around the mainshaft 124 and on bearings 123. The narrow chain 96 is mounted around a sprocket 126 to drive the same accessories, as indicated above relative to the conventional transmission 40. Specifically, the chain 96 extends around the gears or sprockets 62 and 66 formed on the respective jackshafts 104 and 106 for the power steering pump and air conditioner compressor 70 and 72, respectively. A gear 108 formed on the shaft 104 drives the gear 64 formed on a shaft 112 of the generator 74, while a gear 114 formed on the shaft 106 drives the gear 68 formed on a shaft 118 of the generator 80, the shafts 104, 106, 112, and 118 being rotatably supported on pads or bosses 105, 107, 113, and 119, respectively, formed on the drive box 12.

It is apparent that the pads or bosses which would be formed on the inner surface 14 of the case 12 would be similar to the pads or bosses illustrated and described with respect to FIGS. 3–6.

Figure 7:
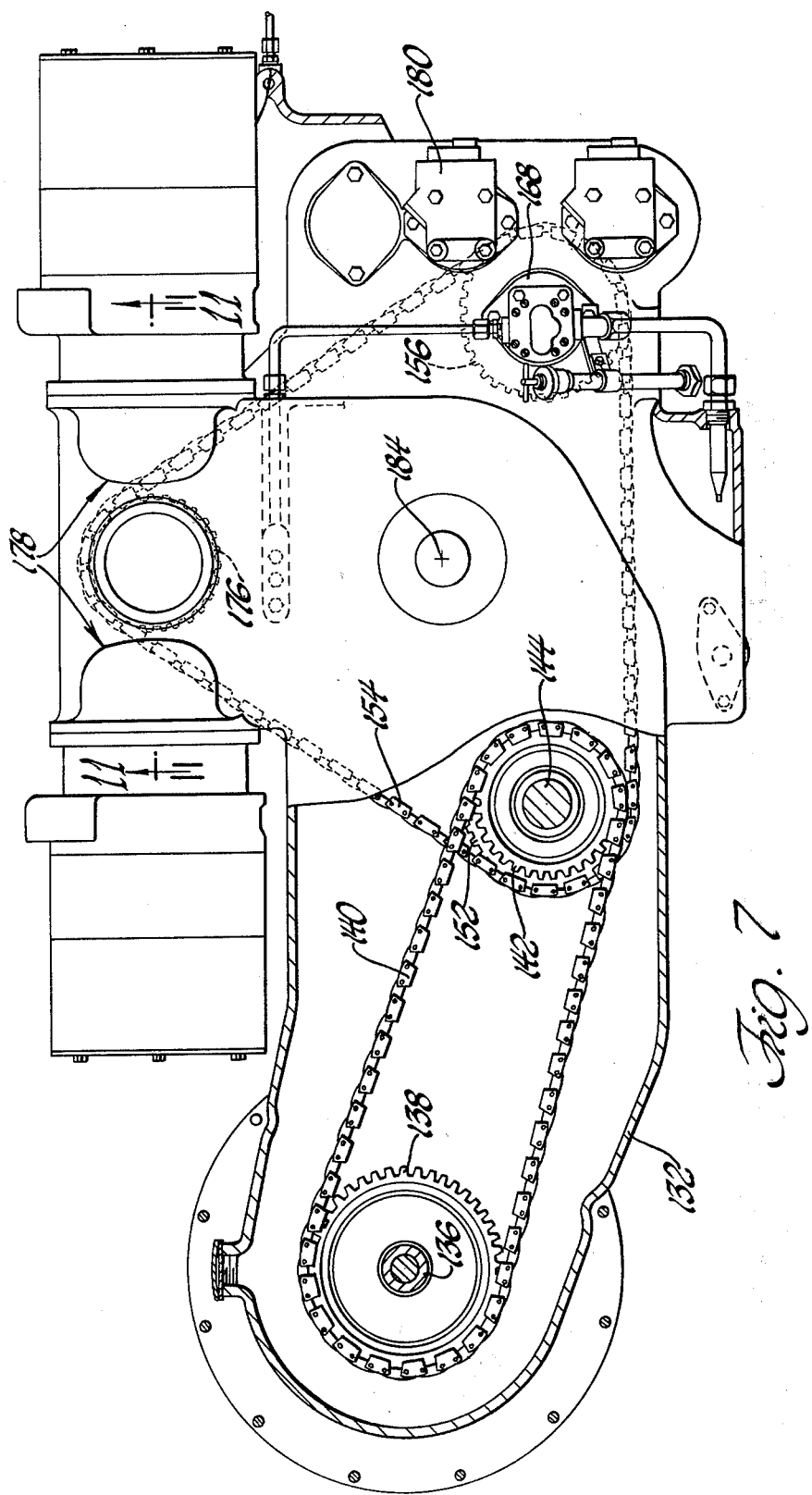
FIG. 7 is a cross-sectional view of an alternate embodiment of one engine-transmission arrangement embodied in the invention.

Referring now to FIG. 7, the left-hand portion of a case 132, similar to the case 12, is adaptable to the mounting therein of a turbine engine output shaft 136. The shaft 136 is rotatably mounted on a pad or boss 134 (FIG. 8) formed on the case 132 and drives a sprocket 138 around which an input chain 140 is mounted. The chain 140 connects with a sprocket or gear 142 mounted on a countershaft 144 to provide the input to the toric transmission 120. The countershaft 144 is rotatably mounted on a pad or boss 145 formed on the case 132.

Figure 8:
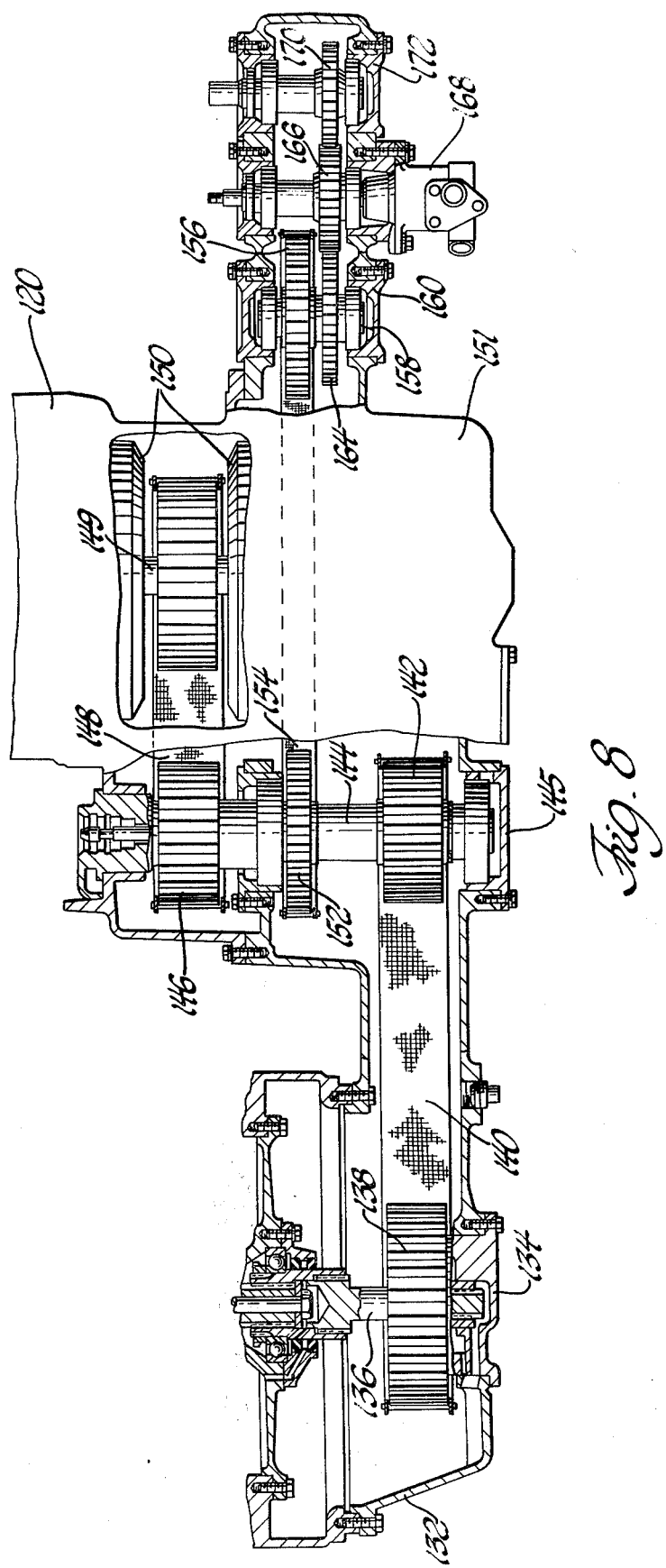
FIG. 8 is a fragmentary cross-sectional view of an arrangement similar to that of FIG. 7.

It may be noted in FIG. 8 that an additional sprocket 146 is mounted on the countershaft 144 and has a chain 148 mounted thereon which extends into the area intermediate the two input races 150 of the toric transmission 120 to drive the transmission mainshaft 149. It may be further noted that the case 132 may be formed at 151 so as to accommodate one output race portion (not shown) of the toric transmission 120. Another sprocket or gear 152 is formed on the countershaft 144 and has an accessory drive chain 154 mounted thereon and extending to a gear or sprocket 156 mounted on a stubshaft 158, the latter being rotatably supported on a pad 160 formed on the case 132. A gear 164 formed on the stubshaft 158 meshes with an adjacent gear 166 (FIG. 8) to drive a lubrication pump 168, when the latter is not mounted on the pad 160, as would be the case in FIG. 7. The gear 166, in turn, meshes with another gear 170, which is adaptable to drive still another accessory which may be selectively mounted on a pad 172 formed on the case 132 which, as illustrated in FIG. 7, may be an air conditioner compressor 180.

Referring back to FIG. 7, it may be noted that the chain 154, mounted on the gear 152 of the countershaft 144, is illustrated as being substantially triangular in shape and leading upwardly in FIG. 7 to a gear or sprocket 176 which serves to drive dual generators 178, as well as the above-mentioned gear 156.

Figure 9:
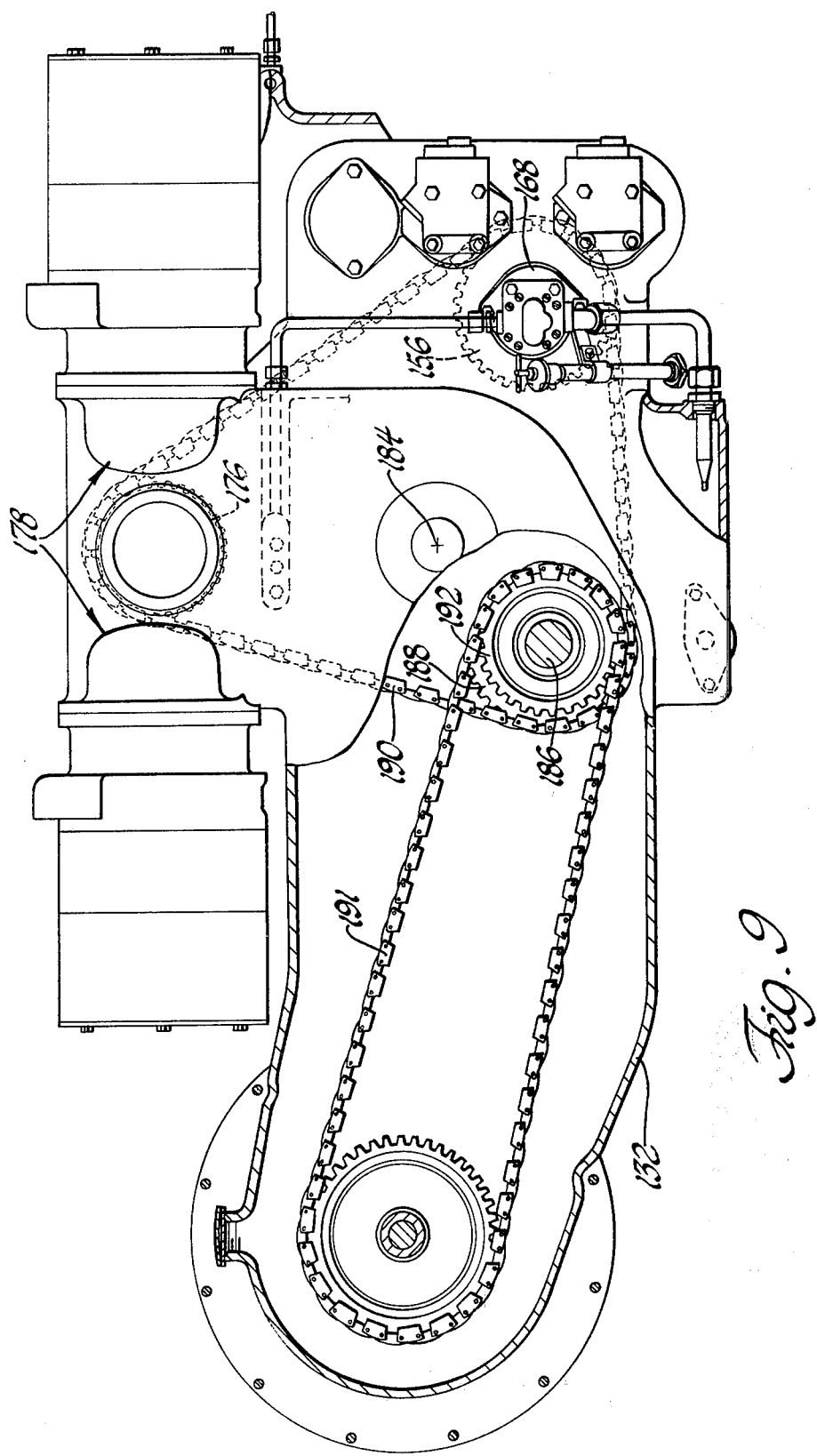
FIG. 9 is an alternate embodiment, similar to that of FIG. 7, and including a different engine-transmission combination.
Figure 10:
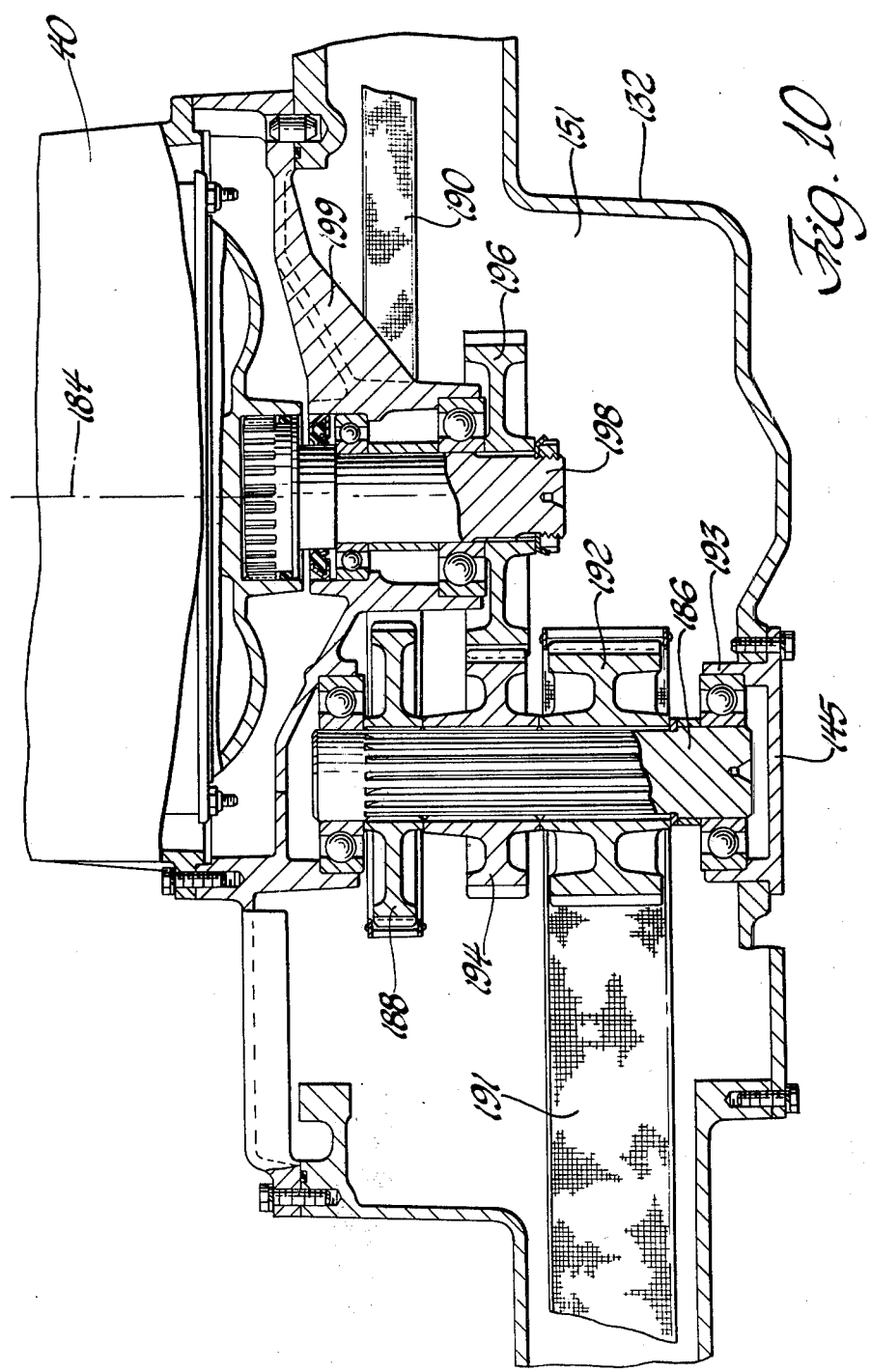
FIG. 10 is a fragmentary cross-sectional view of a portion of FIG. 9.

FIGS. 7 and 9 illustrate a common axis 184 for both transmissions 40 and 120, with a countershaft 186 (FIG. 9) for the conventional transmission 40 being located to the right of the toric transmission countershaft 144 (FIG. 7) location, closer to the common axis 184. A sprocket or gear 188, comparable to the sprocket 152, (FIG. 7) is mounted or formed on the countershaft 186. An accessory drive chain 190, longer than the chain 154 of FIG. 7, extends therearound and around the generator gear 176 and the lubrication pump accessory gear 156. FIG. 10 illustrates the conventional transmission 40 countershaft 186 with a main drive chain 191 comparable to the chain 140 of FIG. 7 being mounted on a sprocket 192 formed on the countershaft 186. The countershaft 186 is rotatably mounted on bearings 193 rotatably supported on the boss 145. A gear 194, mounted on the countershaft 186, meshes wih a gear 196 formed on a jackshaft 198 which is rotatably mounted in an adapter plate 199 on the common axis 184 to drive the conventional transmission 40.

Figure 11:
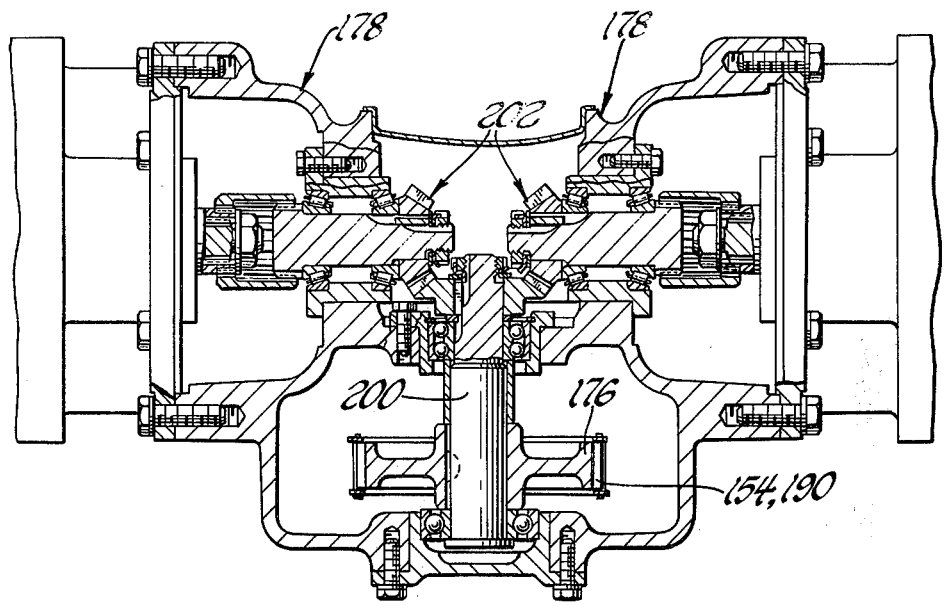
FIG. 11 is a fragmentary cross-sectional view taken along the plane of line 11—11 of FIG. 7.

Referring to FIG. 11, it may be noted that the accessory drive chain 154 of the toric transmission arrangement or 190 of the conventional transmission arrangement drives the generator sprocket 176 which is mounted on a shaft 200 which, in turn, has a suitable bevel gearing arrangement 202 mounted thereon for driving the dual generator arrangement 178.

Figure 12:
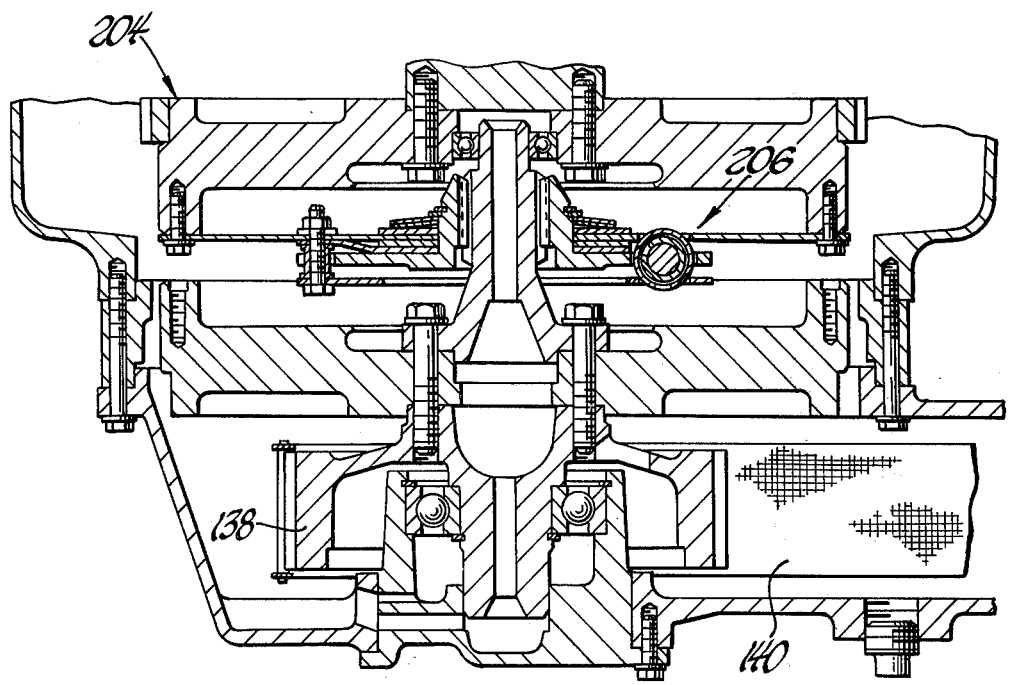
FIG. 12 is a fragmentary cross-sectional view of an alternate embodiment of the engine portion of FIG. 8.

As may be noted in FIG. 12, a diesel engine arrangement 204 may be employed in lieu of the gas turbine or conventional piston engines. In this event, the above-described sprocket 138 and input chain 140 would still be utilized to drive the associated selected toric or conventional transmission 40 or 120, respectively, and a suitable torsional dampening means 206 would be operatively connected to the output of the engine 204.

It may be noted that, when a toric transmission 120 is used, the output thereof is automatically in the opposite direction, as required to properly drive the accessories in their originally established rotational direction, by virtue of the direction of rotation of the races and, hence, the countershaft arrangement thereof serves to conserve space; whereas, when a conventional transmission 40 is used, the countershaft arrangement serves to reverse direction as required to accommodate the originally established rotational direction of the accessories.

It should be apparent that the invention provides improved and versatile means for selectively mounting any of a diesel, gas turbine, electric, steam or piston engine connection with either a toric or an automatic or manual transmission in a compact manner, mounted on various accessory mounting pads which are uniformly adaptable for use in any engine-transmission combination, with the toric and conventional transmission countershafts being located on different centers in order to ensure that regardless of the engine-transmission combination and the resultant rotational directions thereof, all the accessories would run within respective 5 rpm maximum speed ranges and in the same direction originally established.

While three general embodiments of the invention, each providing for multiple engine-trasmission combinations, have been shown and described, other modifications are possible.

We claim:

1. A power transfer arrangement for use with a predetermined engine and a predetermined transmission mounted in a parallel relationship, said transfer arrangement comprising a drive box mounted adjacent the output and input faces, respectively, of said engine and said transmission and including a contoured outer wall and a contoured inner wall, said inner contoured wall being secured to said engine output face and to said transmission input face; a drive shaft extending from said output face of said engine through an opening formed in said contoured inner wall and rotatably mounted on the inner surface of said contoured outer wall of said drive box; input means for said transmission including a countershaft having the ends thereof rotatably mounted on the respective inner surfaces of said contoured outer and inner walls of said drive box a predetermined distance from said drive shaft; a mainshaft extending from said transmission and rotatably mounted through an opening formed in said contoured inner wall into said drive box adjacent and parallel to said countershaft; a plurality of vehicular accessories mounted at predetermined locations on said contoured outer and inner walls of said drive box and each having a shaft extending therefrom and rotatably mounted at predetermined locations on the inner surface of the oppositely disposed wall of said drive box apart from the area adjacent said engine; first and second sprockets mounted respectively on said drive shaft and said countershaft, and a third sprocket mounted on said countershaft; additional sprockets mounted on said shafts of at least two of said plurality of vehicular accessories; first and second operatively interconnected driving means mounted respectively on said countershaft and said mainshaft; a first drive chain mounted around said first sprocket on said drive shaft and said second sprocket on said countershaft; and a second drive chain mounted around said third sprocket on said countershaft and said sprockets of said at least two of said accessories, said first drive chain serving to drive said countershaft, said operatively interconnected driving means serving to drive said mainshaft and hence said transmission, and said second drive chain serving to drive said accessories.

2. A power transfer arrangement for use with a predetermined engine and a predetermined transmission mounted in a parallel relationship, said transfer arrangement comprising a drive box mounted adjacent the output and input faces, respectively, of said engine and said transmission and including a contoured outer wall and a contoured inner wall, said inner contoured wall being secured to said engine output face; an adapter member secured around an opening formed in said contoured inner wall and secured to said transmission input face; a drive shaft extending from said output face of said engine through an opening formed in said contoured inner wall and rotatably mounted on the inner surface of said contoured outer wall of said drive box; input means for said transmission including a countershaft located a predetermined distance from said drive shaft and having one end thereof rotatably mounted on the inner surface of said contoured outer wall of said drive box and the other end thereof rotatably mounted on the inner surface of said adapter member; a mainshaft extending from said transmission and rotatably mounted through an opening formed in said adapter member into said drive box adjacent and parallel to said countershaft; a plurality of vehicular accessories mounted at predetermined locations on said contoured outer and inner wall of said drive box and each having a shaft extending therefrom and rotatably mounted at predetermined locations on the inner surface of the oppositely disposed wall of said drive box apart from the area adjacent said engine; first and second sprockets mounted respectively on said drive shaft and said countershaft, and a third sprocket mounted on said countershaft; additional sprockets mounted on said shafts of at least two of said plurality of vehiclular accessories; first and second operatively interconnected driving means mounted respectively on said countershaft and said mainshaft; a first drive chain mounted around said first sprocket on said drive shaft and said second sprocket on said countershaft; and a second drive chain mounted around said third sprocket on said countershaft and said sprockets of said at least two of said accessories, said first drive chain serving to drive said countershaft, said operatively interconnected driving means serving to drive said mainshaft and hence said transmission, and said second drive chain serving to drive said accessories.

3. The power transfer arrangement described in claim 2, wherein said adapter member may be changed to accommodate a longer countershaft and to suit being secured to different types of continuously variable, conventional automatic and conventional manual transmissions.

* * * * *

UNITED STATES PATENT AND TRADEMARK OFFICE
CERTIFICATE OF CORRECTION

PATENT NO. : 3,985,035

DATED : October 12, 1976

INVENTOR(S) : Donald L. Manning, Milton H. Scheiter

It is certified that error appears in the above-identified patent and that said Letters Patent are hereby corrected as shown below:

Column 2, line 50, after "are" insert -- mounted on --.

line 51, after "on" delete -- mounted on --.

Column 3, line 12, insert "a" before -- gear --.

line 30, delete -- and --.

Column 4, line 37, "wih" should read -- with --.

Column 5, line 12, delete "direction".

line 12, insert "direction" after -- established --.

Signed and Sealed this

Twelfth Day of April 1977

[SEAL]

Attest:

RUTH C. MASON
*Attesting Officer*

C. MARSHALL DANN
*Commissioner of Patents and Trademarks*